(12) United States Patent
Agata et al.

(10) Patent No.: US 10,348,976 B2
(45) Date of Patent: Jul. 9, 2019

(54) IMAGING DEVICE AND IMAGE PROCESSING METHOD FOR EXPANDING CONTRAST OF IMAGE BY USING GRAYSCALE HISTOGRAM OF IMAGE DATA

(71) Applicant: HITACHI KOKUSAI ELECTRIC INC., Tokyo (JP)

(72) Inventors: Yoshiki Agata, Tokyo (JP); Muneaki Yamaguchi, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/736,789

(22) PCT Filed: May 25, 2016

(86) PCT No.: PCT/JP2016/065475
§ 371 (c)(1),
(2) Date: Dec. 15, 2017

(87) PCT Pub. No.: WO2016/203922
PCT Pub. Date: Dec. 22, 2016

(65) Prior Publication Data
US 2018/0205867 A1    Jul. 19, 2018

(30) Foreign Application Priority Data

Jun. 16, 2015 (JP) .................................. 2015-120754

(51) Int. Cl.
*H04N 5/235* (2006.01)
*G06T 5/40* (2006.01)
*G06T 5/00* (2006.01)
*H04N 5/232* (2006.01)

(52) U.S. Cl.
CPC ........... *H04N 5/2355* (2013.01); *G06T 5/009* (2013.01); *G06T 5/40* (2013.01); *H04N 5/235* (2013.01); *H04N 5/2356* (2013.01); *H04N 5/23229* (2013.01)

(58) Field of Classification Search
CPC ........ H04N 5/2355; H04N 5/235; G06T 5/40; G06T 2207/20182; G06T 5/009
See application file for complete search history.

(56) References Cited

U.S. PATENT DOCUMENTS 7,840,066 B1 * 11/2010 Chen ....................... G06T 5/002
382/168

* cited by examiner

*Primary Examiner* — Ahmed A Berhan
(74) *Attorney, Agent, or Firm* — Bacon & Thomas, PLLC (57) ABSTRACT

In a method for determining upper and lower limit values for a target brightness when image contrast is extended, an upper and lower limit value search processing unit establishes two adjacent areas in accordance with brightness of a grayscale histogram, and, while scanning the positions of those areas, compares the frequency of those areas to a threshold, and if one frequency value is greater than or equal to the threshold value and the other frequency value is lower than the threshold, performs upper and lower limit value search processing wherein a brightness value at the boundary of the two areas is determined as an upper or lower limit value. Thresholds for upper and lower limit value search start position and frequency are established based on the shape of the grayscale histogram of an image to be processed. The shape of the grayscale histogram is identified according to preset classifications.

7 Claims, 9 Drawing Sheets

SET MOVING AMOUNT GREATER THAN DEFAULT BY THREE TIMES DUE TO FLATNESS

FIG.7B

SET MOVING AMOUNT GREATER THAN DEFAULT BY TWICE DUE TO SMALL INCLINATION

FIG.7C

SET MOVING AMOUNT TO BE THE SAME AS DEFAULT DUE TO ABRUPT INCLINATION

BRIGHT IMAGE AND HISTOGRAM

FIG.9B (RELATED ART)

DARK IMAGE AND HISTOGRAM

FIG.9C (RELATED ART)

CORRECTED IMAGE AND HISTOGRAM

FIG. 10A
(RELATED ART)

ORIGINAL IMAGE

FIG. 10B
(RELATED ART)

EXTRACTION OF
HISTOGRAM

FIG. 10C
(RELATED ART)

CALCULATION OF
UPPER AND LOWER
LIMIT VALUES

FIG. 10D
(RELATED ART)

EXPANSION OF
HISTOGRAM

FIG. 10E
(RELATED ART)

CORRECTED IMAGE

IMAGING DEVICE AND IMAGE PROCESSING METHOD FOR EXPANDING CONTRAST OF IMAGE BY USING GRAYSCALE HISTOGRAM OF IMAGE DATA

FIELD OF THE INVENTION

The present invention relates to an imaging device and an image processing method for expanding a contrast of an image by using a grayscale histogram of an image data; and, more particularly, to an imaging device and an image processing method capable of shortening processing time and improving calculation accuracy in calculating an upper and a lower limit value of a brightness value.

BACKGROUND OF THE INVENTION (Description of Prior Art: FIGS. 9A to 9C)

In a conventional imaging device, an image processing unit controls a contrast by using a grayscale histogram of an input image in order to correct a bright image and a dark image so that the images become more visible.

Figure 9A:
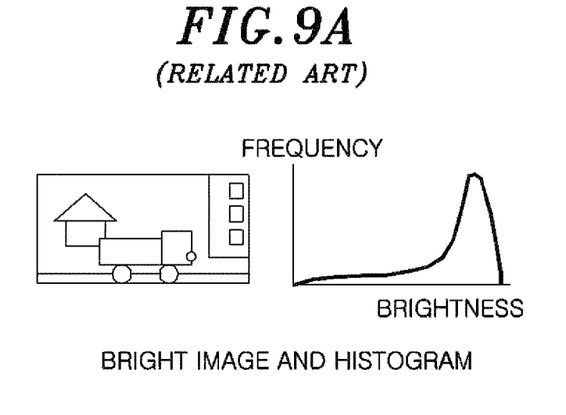
FIGS. 9A to 9C explain contrast control in a conventional imaging device.
Figure 9B:
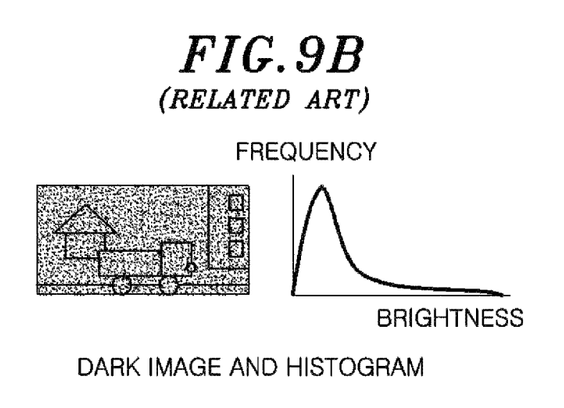
Figure 9C:
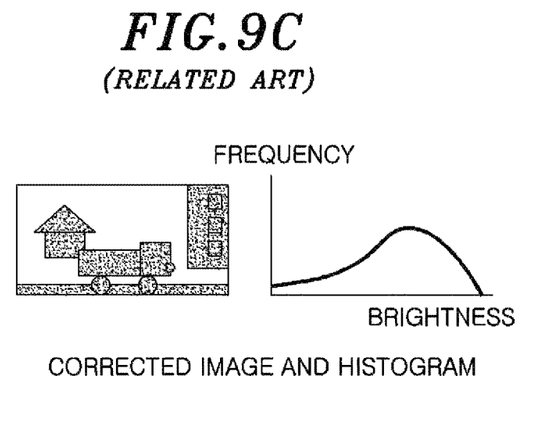

FIGS. 9A to 9C explain contrast control in the conventional imaging device.

A grayscale histogram is a frequency graph showing a brightness level (brightness) and an occurrence frequency (frequency) of pixels in an image. As shown in FIG. 9A, a grayscale histogram of a bright image has a shape in which a high brightness value has a high frequency and a peak is biased to a high brightness side.

As shown in FIG. 9B, a grayscale histogram of a dark image has a shape in which a peak is biased to a low bright side.

These images have a small contrast difference and a low visual perception level (difficult to see).

As shown in FIG. 9C, a process of extracting a range of brightness in which the frequency is high and expanding brightness value distribution of the corresponding range (grayscale histogram expansion) is performed on the grayscale histogram in which the brightness value distribution is biased.

Accordingly, a grayscale gradation of an image is expanded and the visual perception is improved. As a result, a corrected image that is easy to see can be generated.

(Outline of Conventional Grayscale Histogram Expansion Process: FIGS. 10A to 10E)

FIGS. 10A to 10E explain an outline of a grayscale histogram expansion process in the conventional imaging device.

Figure 10A:
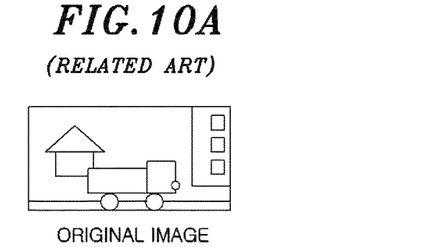
FIGS. 10A to 10E explain an outline of a grayscale histogram expansion process in the conventional imaging device.

As shown in FIGS. 10A to 10E, an image processing unit of the conventional imaging device calculates a grayscale histogram (FIG. 10B) from an inputted original image (FIG. 10A).

Figures 10B, 10C:
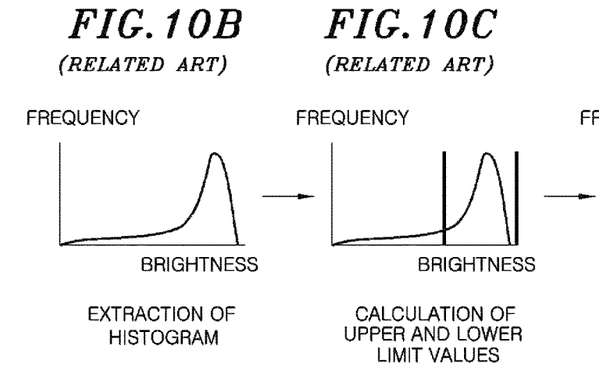
Figure 10D:
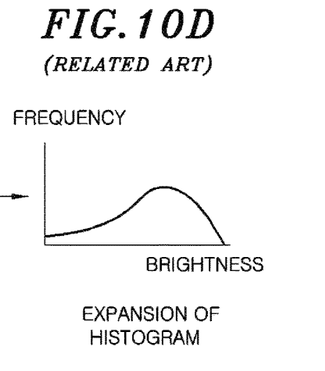

Next, an upper limit value and a lower limit value of a brightness are determined in order to extract a range of concentrated brightness (of high frequency) (FIG. 10C).

Figure 10E:
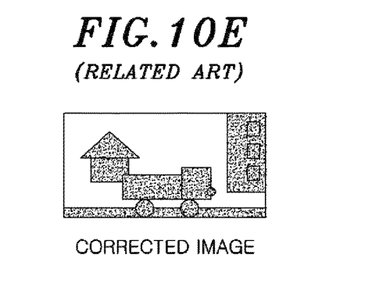

A histogram is expanded (FIG. 10D) by correcting an entire brightness value such that an upper limit value becomes a maximum brightness value and a lower limit value becomes a minimum brightness value. Accordingly, a corrected image is obtained (FIG. 10E).

In other words, the range of the concentrated brightness value to be extracted needs to be determined in order to expand a grayscale histogram.

A method for automatically calculating an upper and a lower limit value by using an image processor is suggested as a method for correcting an image by calculating an optimal upper limit value and an optimal lower limit value in real time for monitoring purposes.

For example, based on an opinion that it is optimal to set an upper and a lower limit value of the grayscale histogram to the foot of the mountain of the histogram, the foot of the mountain is automatically detected as the upper and the lower limit value.

The expansion of the grayscale histogram may be performed uniformly on the entire image frame or may be performed on the basis of partial images obtained by dividing the frame in a lattice shape. The latter case is suitable for distributed parallel processing.

For installation in an apparatus, the realization in a small logic capacity is required.

(Conventional Method for Calculating Upper and Lower Limit Value: FIGS. 11A to 11D)

FIGS. 11A to 11D explain an example of calculating an upper and a lower limit value of a grayscale histogram in a conventional case.

As for a method for calculating an upper and a lower limit value with a small logic capacity, there is suggested a method using distribution of two consecutive areas in a histogram as shown in FIGS. 11A to 11D.

Figure 11A:
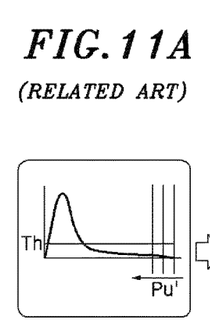
FIGS. 11A to 11D explain an upper and lower limit value calculation method in a conventional grayscale histogram.

First, the frequency values of two consecutive (adjacent) areas (classes) from the end of the histogram are obtained (FIG. 11A). In FIG. 11A, the searching is performed at a high brightness side. Two areas (bins) having the same width with an upper limit value candidate Pu' interposed therebetween are set at the high bright side and the low bright side and the frequency values of the two bins are obtained.

The frequency values of the two areas are compared with a preset threshold value Th.

Figure 11B:
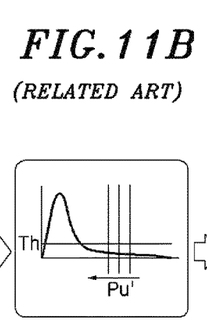
Figure 11C:
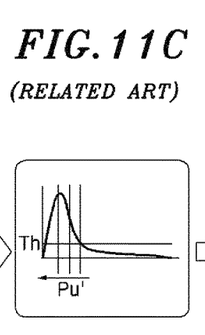

In the example of FIG. 11A, the frequency values of the two areas are smaller than the threshold value. Therefore, the upper limit value candidate Pu' is moved by a predetermined amount toward the low bright side in a next image frame and, then, the frequency values of two bins with the upper limit value candidate Pu' interposed therebetween are compared with the threshold value (FIG. 11B).

When the frequency values of the two bins are greater than or equal to the threshold value (FIG. 11C), the upper limit value candidate Pu' is moved to the high bright side.

Figure 11D:
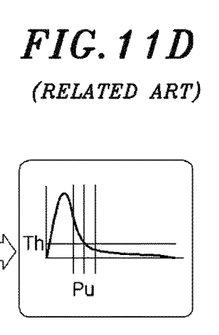

The above processes are repeated. When the frequency value of one of the bins is greater than or equal to the threshold value and the frequency value of the other bin is smaller than the threshold value, the upper limit value candidate Pu' that is the boundary of the two bins is determined to be the foot of the mountain and determined as an upper limit value Pu (FIG. 11D).

The process of determining whether the frequency value of one of the two areas is greater than or equal to the threshold value and whether the frequency value of the other area is smaller than the threshold value is referred to as a determination process.

The actual frequency graph (histogram) is not as smooth as that shown in FIGS. 11A to 11D. "The frequency of the bin" may not be the frequency itself and may be a value representing the frequency distribution of the bin, e.g., an average value of three areas including the bin and the areas at both sides thereof, a central value thereof or the like. In that case, frequency values of four consecutive areas are calculated to obtain frequency values of two adjacent bins.

Similarly, the determination process is performed by sequentially moving a lower limit value candidate Pl' from the end of the low bright side of the histogram. When the frequency value of one of the two areas with a lower limit value candidate Pl' interposed therebetween is greater than or equal to the threshold value and the frequency value of the other area is smaller than the threshold value, the corresponding lower limit value candidate Pl' is determined as a lower limit value Pl.

However, in a prior art, the bin is moved by a small amount. Therefore, five to ten frames are required to determine an upper and a lower limit value.

This indicates that the image is not corrected quickly. For example, several frames are required until a dark image becomes bright.

(Difference Caused by Shape of Histogram: FIGS. 12A and 12B)

Figure 12A:
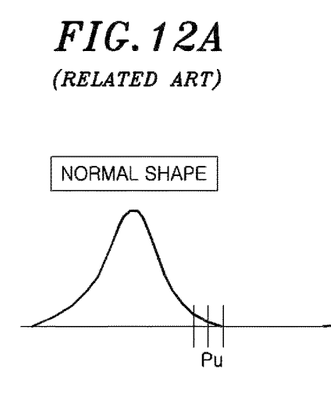
FIGS. 12A and 12B explain a difference in rising phase depending on a shape of a histogram.
Figure 12B:
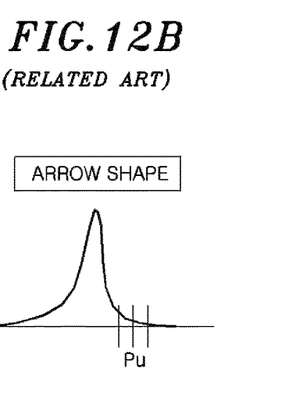

A problem may be caused by a shape of a histogram. FIGS. 12A and 12B explain a difference caused by a shape of a histogram.

As shown in FIG. 12A, the calculation of the upper and the lower limit value using two areas is performed by using the threshold set based on the histogram having a normal shape. Therefore, an optimal upper and an optimal lower limit value may not be determined depending on a shape of a histogram.

For example, in the case of an arrow shape shown in FIG. 12B, the upper limit value Pu is determined far from the foot of the mountain and, thus, it may not be an optimal value.

In other words, the accuracy in determining the upper and the lower limit value is not uniform depending on a shape of a grayscale histogram.

(Related Art)

As for a technique for improving a contrast of an image, there are known Japanese Patent Application Publication No. 2006-500643 "Active visual perception method and device for characterisation and recognition through the analysis of mono/multidimensional parameters in multiclass computing units and histogram processing, dynamic unit recruitment" (HOLDING BEv. S.A) (Patent Document 1) and Japanese Patent Application Publication No. 2013-55552 "Imaging device" (Hitachi Consumer Electronics Co., Ltd.) (Patent Document 2).

Patent Document 1 discloses a processing method and an apparatus for making an image clear by using a grayscale histogram.

Patent Document 2 discloses a technique for correcting a contrast by generating a control parameter for controlling a range and a degree of correction of the contrast depending on a grayscale histogram and changing signals of DC component and AC component of an image based on the control parameter.

Patent Document 1: Japanese Patent Application Publication No. 2006-500643
Patent Document 2: Japanese Patent Application Publication No. 2013-55552
Patent Document 3: Japanese Patent Application Publication No. 2008-104016
Patent Document 4: Japanese Patent No. 4277773

However, as described above, the conventional imaging device and the conventional image processing method are disadvantageous in that long convergence time is required until the upper and the lower limit value are determined because the searching is performed while moving the candidate value by a small amount in determining the upper and the lower limit value of the grayscale histogram. This is a considerable drawback in real-time monitoring.

Further, the conventional imaging device and the conventional image processing method are disadvantageous in that it is not possible to appropriately calculate the upper and the lower limit value depending on a shape of a grayscale histogram and the calculation accuracy is not uniform.

In another method of determining an upper and a lower limit value, e.g. in a method of calculating an upper and a lower limit value by using a ratio of a frequency based on the entire histogram or the like, the processing becomes complicated and the logic capacity is increased. Therefore, such a method is not suitable for an imaging device.

Specifically, in the case of calculating the entire distribution not the frequency of two consecutive bins only in the brightness distribution, it is difficult to keep the entire distribution in a cash memory and a register in a CPU and the access to an external memory is needed. This may lead to an increase in the processing time.

Patent Documents 1 and 2 do not disclose therein a technique for controlling scanning speeds of two adjacent bins in accordance with a shape of a grayscale histogram in searching an upper and a lower limit value and a technique for controlling a scanning start position and/or a threshold value in accordance with a shape of a grayscale histogram.

SUMMARY OF THE INVENTION

In view of the above, the present invention provides an imaging device and an image processing method capable of quickly and accuracy determining an upper and a lower limit value in accordance with a shape of a grayscale histogram without increasing the aforementioned logic capacity.

In accordance with an aspect, there is provided an imaging device including: a contrast correction unit configured to extract a grayscale histogram from an input image and expand a contrast in a specific brightness range in the grayscale histogram, wherein the contrast correction unit includes: an upper and lower limit value search processing unit for scanning two adjacent areas in accordance with brightness in a grayscale histogram of one frame extracted from the input image and determining whether or not a condition in which a frequency of brightness in one of the two areas is greater than or equal to a preset threshold value and a frequency of brightness in the other area is smaller than the threshold value is satisfied, wherein when the condition is not satisfied, scanning speeds of the two areas are controlled by changing a moving amount from the positions of the two areas to positions of two adjacent areas in accordance with brightness in a grayscale histogram of next one frame based on a shape of the grayscale histogram and the determination process is performed on the grayscale histogram of the next one frame, and wherein when the condition is satisfied, a brightness value at a boundary of the two areas is determined as an upper or a lower limit value of the specific brightness range.

In accordance with another aspect, there is provided an imaging device including: a contrast correction unit configured to extract a grayscale histogram from an input image and expand a contrast in a specific brightness range in the grayscale histogram, wherein the contrast correction unit includes: a shape identifier for identifying a shape of the grayscale histogram; and an upper and lower limit value search processing unit for performing upper and lower limit value search processing for scanning two adjacent areas in accordance with brightness of the grayscale histogram and determining an upper and a lower limit value of the specific brightness range based on comparison between frequency values of the two areas and a preset threshold value, and wherein the upper and lower limit value search processing unit adjusts scanning start positions of the two areas and/or the threshold value based on a shape identified by the shape identifier and performs the upper and lower limit value search processing by using the adjusted scanning start position and/or the controlled threshold value.

In the imaging device, the contrast correction unit may include: a shape identifier for storing a plurality of shape patterns by learning features of typical shapes of a grayscale histogram, calculating features of a shape of a grayscale histogram extracted from an input image, and identifying a shape by comparing the calculated features and the features of the stored shape pattern; and an upper and lower limit value search processing unit for adjusting scanning start positions of two adjacent areas and/or a threshold value based on the identified shape.

Further, in the imaging device, when the condition is not satisfied in the determination process, the upper and lower limit value search processing unit obtains a plurality of vectors between adjacent frequency values in a specific range near two areas, determines an inclination of a grayscale histogram based on an average vector of the plurality of vectors, and controls a scanning speed by changing a moving distance from the positions of the two areas to positions of two adjacent areas in accordance with brightness in a grayscale histogram of next one frame based on the inclination.

In accordance with still another aspect, there is provided an image processing method for extracting a grayscale histogram from an input image and expanding a contrast in a specific brightness range in the grayscale histogram. The method includes: storing a plurality of shape patterns by learning features of typical shapes of a grayscale histogram, calculating features of a shape of a grayscale histogram extracted from an input image, and identifying a shape by comparing the calculated features and the features of the stored shape pattern; and scanning two adjacent areas in accordance with brightness in the grayscale histogram at a scanning start position adjusted based on the identified shape in accordance with the brightness and determining whether or not a condition in which a frequency of brightness in one of the two areas is greater than or equal to a threshold value identified based on the identified shape and a frequency of brightness in the other area is smaller than or equal to the threshold value is satisfied. When the condition is not satisfied, a plurality of vectors between adjacent frequency values is obtained in a specific range near the two areas; an inclination of the grayscale histogram is determined based on an average vector of the plurality of vectors; a scanning speed of the two areas is controlled by changing a moving distance from the positions of the two areas to positions of two adjacent areas in accordance with brightness in a grayscale histogram of next one frame based on the inclination; and the determination process is performed on a grayscale histogram of next one frame, and when the condition is satisfied, a brightness value at a boundary of the two areas is determined as an upper or a lower limit value of the specific brightness range.

Effect of the Invention

In accordance with the imaging device of the present invention, the imaging device includes a contrast correction unit configured to extract a grayscale histogram from an input image and expand a contrast in a specific brightness range in the grayscale histogram, wherein the contrast correction unit includes: an upper and lower limit value search processing unit for scanning two adjacent areas in accordance with brightness in a grayscale histogram of one frame extracted from the input image and determining whether or not a condition in which a frequency of brightness in one of the two areas is greater than or equal to a preset threshold value and a frequency of brightness in the other area is smaller than the threshold value is satisfied, wherein when the condition is not satisfied, scanning speeds of the two areas are controlled by changing a moving amount from the positions of the two areas to positions of two adjacent areas in accordance with brightness in a grayscale histogram of next one frame based on a shape of the grayscale histogram and the determination process is performed on the grayscale histogram of the next one frame, and wherein when the condition is satisfied, a brightness value at a boundary of the two areas is determined as an upper or a lower limit value of the specific brightness range. Accordingly, the upper and the lower limit value can be quickly determined in accordance with a shape of a grayscale histogram without increasing a logic capacity and deteriorating searching accuracy.

In accordance with the imaging device of the present invention, the imaging device includes: a contrast correction unit configured to extract a grayscale histogram from an input image and expand a contrast in a specific brightness range in the grayscale histogram, wherein the contrast correction unit includes: a shape identifier for identifying a shape of the grayscale histogram; and an upper and lower limit value search processing unit for performing upper and lower limit value search processing for scanning two adjacent areas in accordance with brightness of the grayscale histogram and determining an upper and a lower limit value of the specific brightness range based on comparison between frequency values of the two areas and a preset threshold value, and wherein the upper and lower limit value search processing unit adjusts scanning start positions of the two areas and/or the threshold value based on a shape identified by the shape identifier and performs the upper and lower limit value search processing by using the adjusted scanning start position and/or the controlled threshold value. Accordingly, the scanning start position and/or the threshold value can be controlled by a simple process and the upper and lower limit value searching process can be optimally performed in accordance with the shape of the grayscale histogram. Further, the upper and lower limit value can be quickly determined without increasing the logic capacity and deteriorating the searching accuracy.

In accordance with the imaging device of the present invention, the contrast correction unit includes: a shape identifier for storing a plurality of shape patterns by learning features of typical shapes of a grayscale histogram, calculating features of a shape of a grayscale histogram extracted from an input image, and identifying a shape by comparing the calculated features and the features of the stored shape pattern; and an upper and lower limit value search processing unit for adjusting scanning start positions of two adjacent areas and/or a threshold value based on the identified shape. Accordingly, the efficiency of the searching process can be improved while maintaining the accuracy by increasing the moving distance when the inclination of the grayscale histogram is small and decreased the moving distance when the inclination of the grayscale histogram is large.

In accordance with the image processing method of the present invention, the image processing method for extracting a grayscale histogram from an input image and expanding a contrast in a specific brightness range in the grayscale histogram includes: storing a plurality of shape patterns by learning features of typical shapes of a grayscale histogram, calculating features of a shape of a grayscale histogram extracted from an input image, and identifying a shape by comparing the calculated features and the features of the stored shape pattern; and scanning two adjacent areas in accordance with brightness in the grayscale histogram at a scanning start position adjusted based on the identified shape in accordance with the brightness and determining whether or not a condition in which a frequency of brightness in one of the two areas is greater than or equal to a threshold value identified based on the identified shape and a frequency of brightness in the other area is smaller than or equal to the threshold value is satisfied. When the condition is not satisfied, a plurality of vectors between adjacent frequency values is obtained in a specific range near the two areas; an inclination of the grayscale histogram is determined based on an average vector of the plurality of vectors; a scanning speed of the two areas is controlled by changing a moving distance from the positions of the two areas to positions of two adjacent areas in accordance with brightness in a grayscale histogram of next one frame based on the inclination; and the determination process is performed on a grayscale histogram of next one frame, and when the condition is satisfied, a brightness value at a boundary of the two areas is determined as an upper or a lower limit value of the specific brightness range. Accordingly, the upper and the lower limit value can be quickly and accurately determined without increasing the logic capacity by optimally controlling the scanning start position, the threshold and the scanning speed of the bin in accordance with the shape of the grayscale histogram.

DETAILED DESCRIPTION OF THE EMBODIMENTS

Embodiments of the present invention will be described with reference to the accompanying drawings.
(Outline of Embodiments)
In an imaging device and an image processing method according to embodiments, when a contrast of an image is expanded, an upper and lower limit value search processing unit 43 sets two adjacent areas in accordance with brightness of a grayscale histogram and compares the frequency of those areas with a threshold value while scanning positions of those areas. If one frequency value is greater than or equal to the threshold value and the other frequency value is lower than the threshold value, the upper and lower limit value search processing unit 43 performs upper and lower limit value search processing in which a brightness value that is the boundary of two areas is determined as an upper or lower limit value. Threshold values for upper and lower limit value search start position and frequency are set adaptively based on the shape of a grayscale histogram of an image to be processed. The shape of the grayscale histogram is identified by preset classifications. A shape identifier 42 stores registered patterns acquired by using a machine learning algorithm, so that the shape is identified from a plurality of patterns, such as "normal-shaped", "arrow-shaped", and "flat-shaped".

In the imaging device and the image processing method, the upper and lower limit value search processing unit 43 controls the scanning speed of the bin by obtaining inclination of the histogram near upper and lower limit value candidates and setting the moving amount between the positions of the upper and the lower limit value candidates and those of the upper and the lower limit value candidates in a next frame based on the inclination.

(Application of the Embodiments)
The imaging device and the image processing method according to the embodiments of the present invention are applied to a monitoring camera used for a monitoring system. An image of the monitoring camera is generally taken in a state where an angle of view is fixed, and there are no sudden changes in pan and scene. The grayscale of the image is not suddenly changed.

(Contrast Expansion)
Prior to the description of the apparatus of the imaging device (percent apparatus) according to an embodiment of the present invention, an outline of a contrast expansion process performed by the present apparatus will be explained.

The contrast expansion process of the present apparatus includes four correction processes, i.e., line correction, column correction, pixel correction and frame correction.

The line correction is performed in the unit of one or more horizontal scanning lines. The column correction is performed in the unit of areas obtained by dividing a frame in a horizontal direction. The pixel correction is performed in the unit of pixel. The frame correction is performed uniformly on the frame. These processes are performed in cascade.

The contrast expansion is mostly performed by the line correction and the column correction at an initial stage of the cascade process. The pixel correction and the frame correction are supportive.

In the present embodiment, the line·column correction using the grayscale histogram which is performed before the pixel correction will be described as an example. However, it is also possible to apply the same method to the correction of any partial area, other than the pixel correction and the frame correction.

Figure 1:
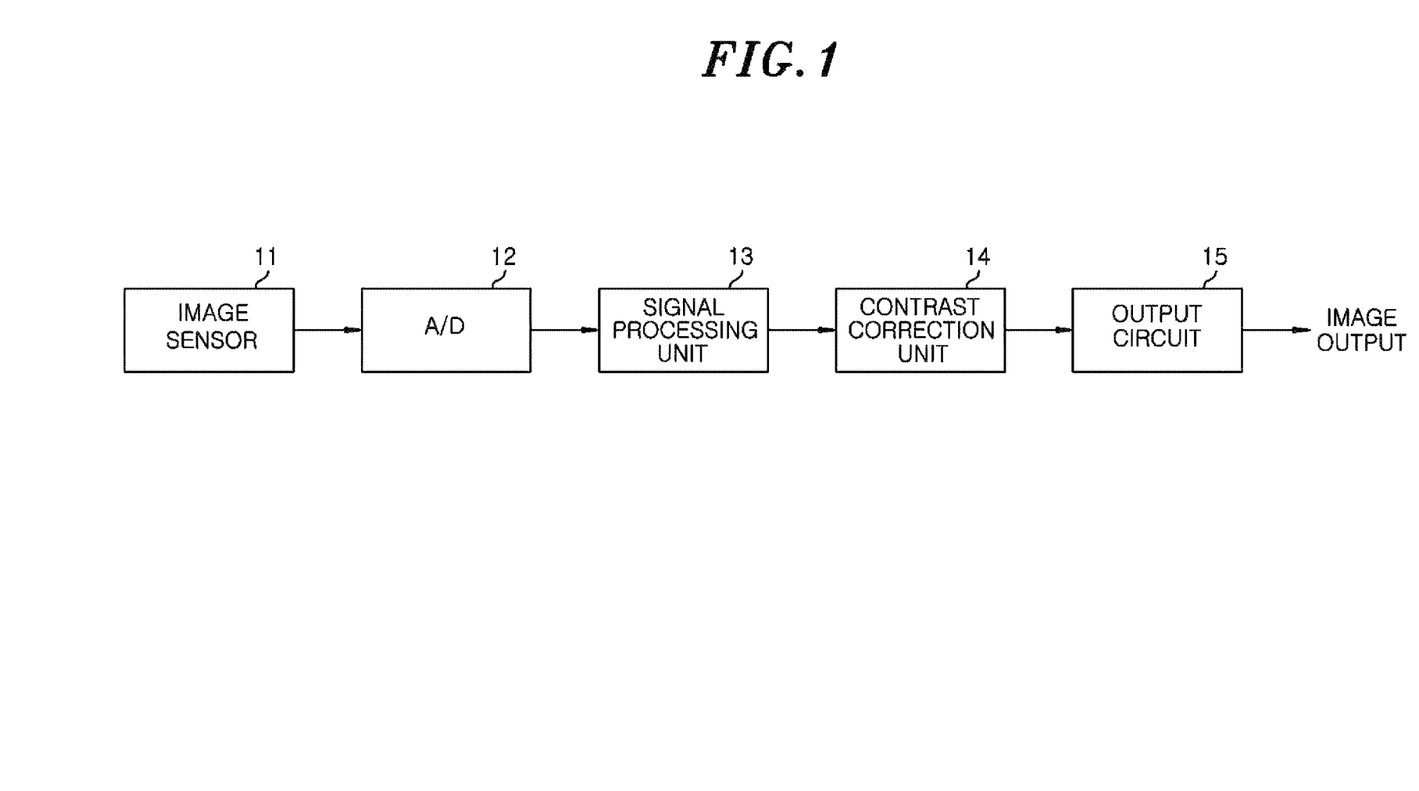
FIG. 1 is a block diagram showing a schematic configuration of an imaging device according to an embodiment of the present invention.

(Configuration 1 of the Present Apparatus)
FIG. 1 is a block diagram showing a schematic configuration of an imaging device according to an embodiment of the present invention.

As shown in FIG. 1, the present apparatus includes an image sensor 11, an A/D (Analog/Digital) converter 12, a signal processing unit 13, a contrast correction unit 14 and an output circuit 15.

The image sensor 11 outputs an image taken by an imaging lens as an image signal.

The A/D converter 12 converts the image signal from an analog signal to a digital signal.

The signal processing unit 13 performs noise removal, brightness(Y)/color(C) signal generation, gamma processing, edge enhancer processing or the like on the image signal that has been converted to the digital signal.

The output circuit 15 outputs the image by converting the image signal corrected by the contrast correction unit 14 to an output signal such as a video signal or the like in accordance with an output device such as a television set or the like.

The contrast correction unit 14 that is the main feature of the present apparatus performs a contrast expansion process of calculating an upper and a lower limit value of a brightness value of a grayscale histogram and expanding a gradation of an image in that range.

The contrast expansion process is performed in the same manner as that described in FIGS. 10A to 10E. However, the contrast correction unit 14 of the present apparatus is characterized in that the process of calculating an upper and a lower limit value of a grayscale histogram is optimized in accordance with the shape of the histogram.

The process of calculating an upper and a lower limit value is basically the same as that described in FIGS. 11A to 11D. The frequency values of two adjacent bins are compared with the threshold value in accordance with the brightness. When the frequency value of one of the two bins is greater than or equal to the threshold value and the frequency value of the other bin is smaller than the threshold value, the brightness value that is the boundary of the two bins is determined as an upper or a lower limit value.

(Configuration 2 of Contrast Correction Unit 14)

Figure 2:
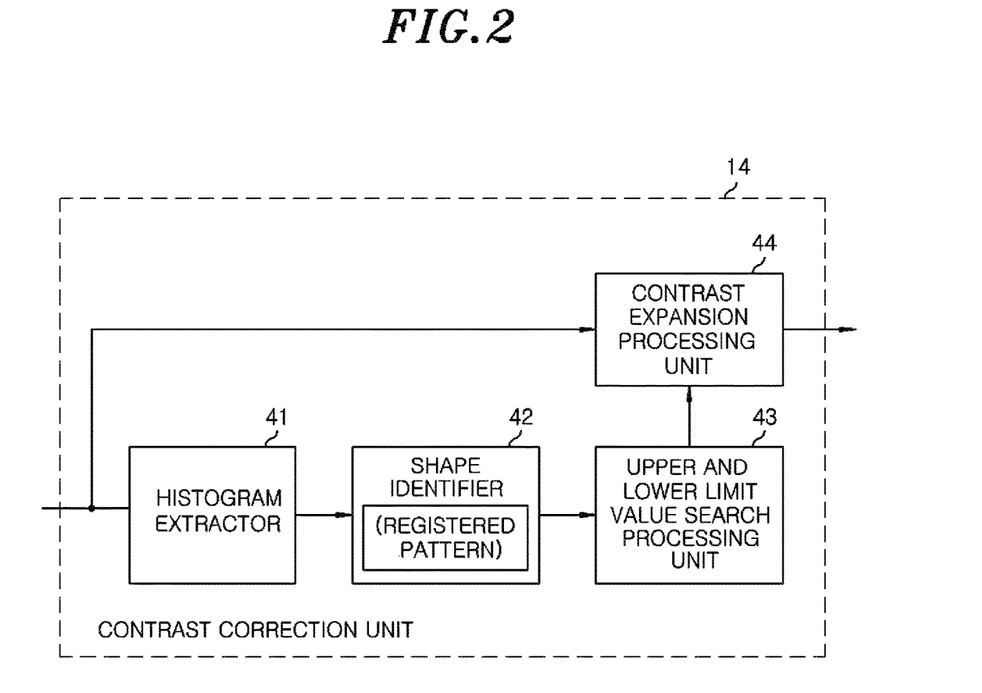
FIG. 2 is a block diagram showing a configuration of a contrast correction unit 14.

FIG. 2 is a functional block diagram of the contrast correction unit 14.

The contrast correction unit 14 includes a histogram extractor 41, a shape identifier 42, an upper and lower limit value search processing unit 43 and a contrast expansion processing unit 44.

In an actual hardware, the contrast correction unit 14 includes a control unit (CPU), a storage unit, an interface unit or the like. The processing in the present apparatus is realized by executing the image processing software stored in the storage unit under the control of the control unit.

The respective components of the contrast correction unit 14 will be described.

The histogram extractor 41 extracts a histogram (grayscale histogram) from an image signal inputted from the signal processing unit 13. Although the generation (update) of the histogram is performed at a frame time interval in this example, a plurality of frames may be used without being limited to the above case. For example, the histogram may be generated from a predetermined number of pixels selected from a plurality of frames.

The shape identifier 42 stores typical histogram shapes that have been learned previously as registered patterns (shape patterns), identifies a registered pattern of a shape of a histogram of an actual input image, and sets the identified shape in the upper and lower limit value search processing unit 43.

A specific process in the shape identifier 42 will be described later.

The upper and lower limit value search processing unit 43 performs upper and lower limit value search processing of selecting search start positions of the upper and the lower limit value of the brightness value and the threshold value of the frequency in accordance with the histogram shape set in the shape identifier 42 and searching the upper and the lower limit value of the brightness value of the grayscale histogram based on the search start positions and the threshold value of the frequency.

The present apparatus is characterized in that the upper and lower limit value search processing unit 43 performs the searching processing of calculating the inclination of the histogram near the bin, selecting an appropriate moving distance among a plurality of previously stored moving distances as a moving distance (moving amount) of the bin on the brightness axis based on the calculated inclination, and moving the bin in a next frame by the corresponding moving amount when the upper and the lower limit value are not determined in the determination process.

In other words, in the present apparatus, the distance between the current position of the bin and the position of the bin in the next frame is controlled based on the inclination of the grayscale histogram, and a substantial bin moving speed (scanning speed) is changed.

As in the conventional case, the contrast expansion processing unit 44 expands the contrast such that the upper limit value becomes the maximum brightness and the lower limit value becomes the minimum brightness in the brightness range determined based on the upper and the lower limit value set by the upper and lower limit value search processing unit 43.

(Outline of Processing in the Present Apparatus: FIGS. 3A to 4C)

Figure 3A:
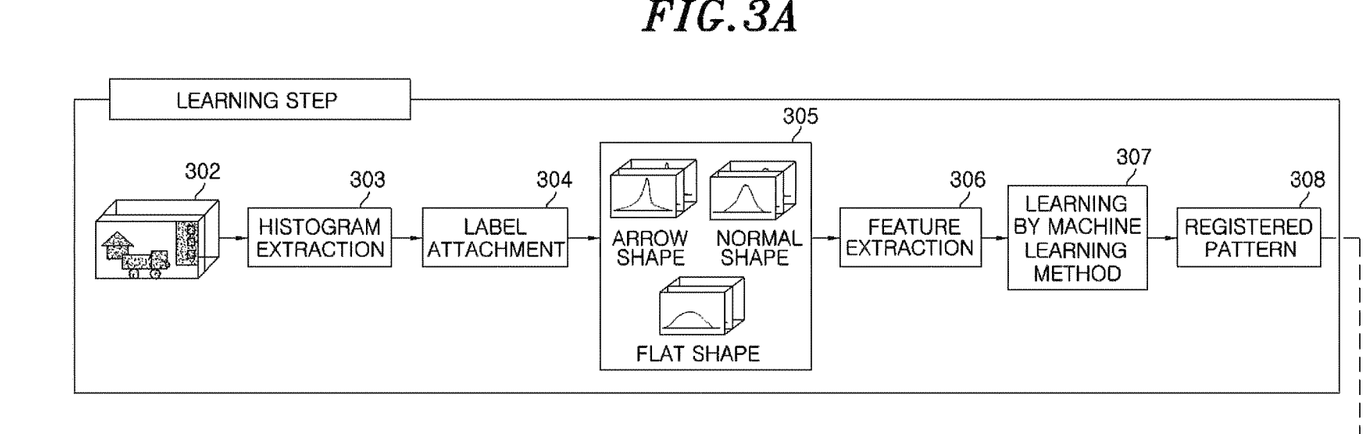
FIGS. 3A and 3B explain an outline of processing in the contrast correction unit 14.
Figure 3B:
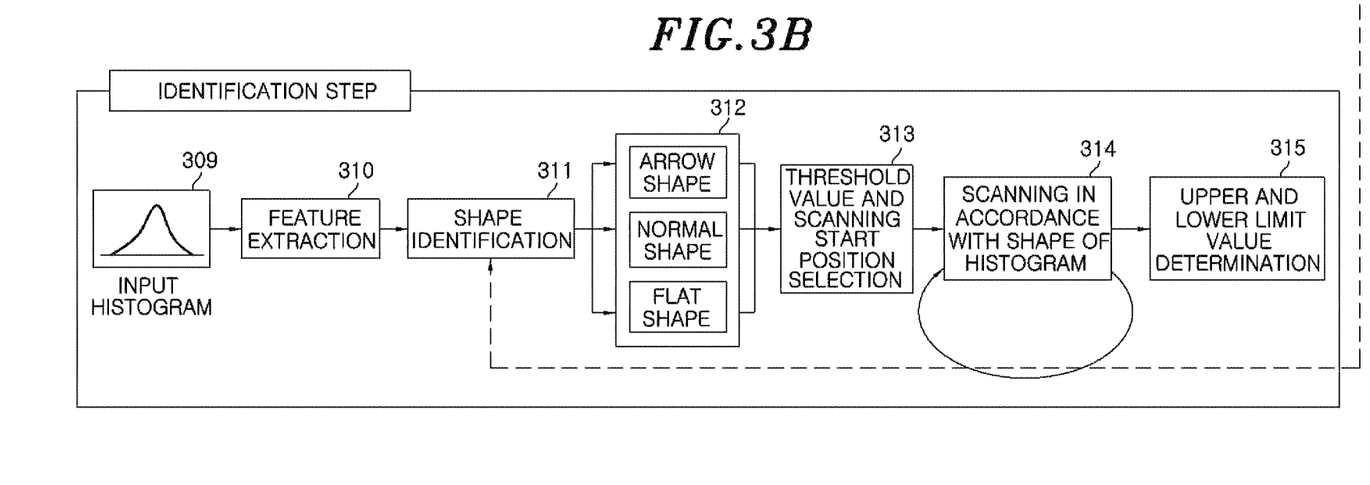
Figure 4A:
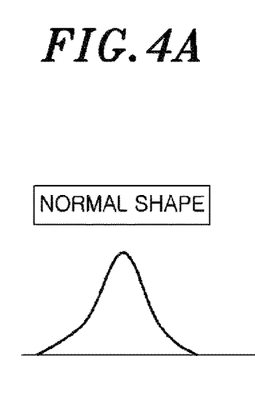
FIGS. 4A to 4C explain three histogram shapes.
Figure 4B:
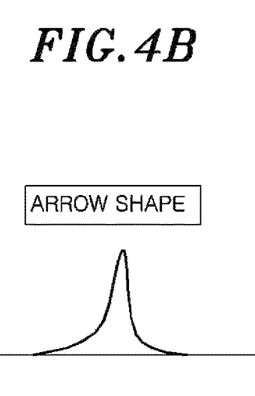
Figure 4C:
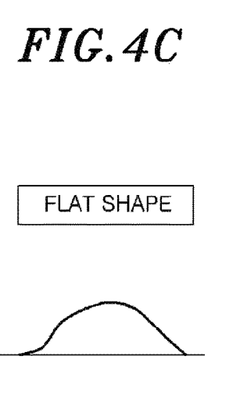

FIGS. 3A and 3B explain the flow of processing performed in the contrast correction unit 14. FIGS. 4A to 4C explain three histogram shapes. In FIGS. 3A and 3B, a learning step (FIG. 3A) that should be performed in advance and the identification step (FIG. 3B) that is a basic part of the contrast correction are illustrated.

The learning step shown in FIG. 3A is performed before the operation of the present apparatus and may be performed by the contrast correction unit 14 or an external computer. In the case of using supervised learning, a plurality of grayscale histograms with labels (information indicating shape) is read out and learned by a machine learning method by extracting the features of the histogram shape; and the characteristic histogram shape for each label is stored as a registered pattern.

As shown in FIGS. 4A to 4C, in the present apparatus, three registered patterns, i.e., "normal shape", "arrow shape" and "flat shape" are stored. The registered patterns are used to identify the shape of the input image in the identification step.

The identification step shown in FIG. 3B is performed after the operation start of the present apparatus. The contrast correction unit 14 extracts the features from the grayscale histogram of the actual input image in the same manner as that in the learning step, determines the registered pattern of the histogram shape, selects optimal parameters (scanning start positions, threshold value of frequency), calculates the inclination of the histogram, and searches the upper and the lower limit value while controlling the moving speed of the bin.

(Specific Steps)

Hereinafter, the learning step and the identification step will be described in detail.

Figure 5:
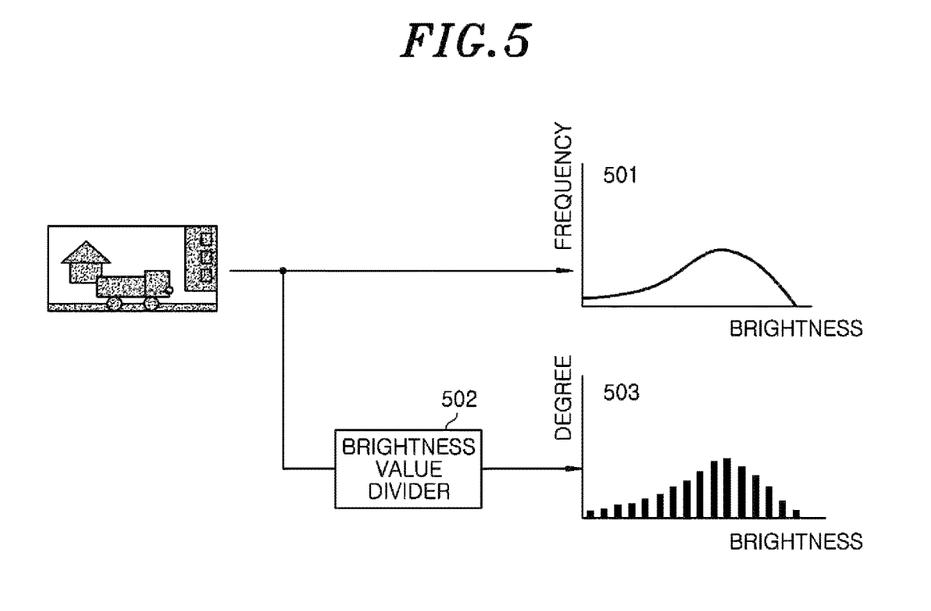
FIG. 5 explains extraction of features.

(Learning Step: FIGS. 3A, 3B and 5)

First, the learning step will be described with reference to FIGS. 3A, 3B and 5. FIG. 5 explains the extraction of the features.

As shown in FIG. 3A, in the learning step, the histogram extractor 41 or the computer inputs an image data (302), extracts a grayscale histogram from the input image data (303) and outputs the extracted histogram to a display unit (not shown).

An operator classifies the shape of the displayed histogram into three representative patterns, i.e., "normal shape", "arrow shape" and "flat shape" shown in FIGS. 4A to 4C, and attaches labels (304). The classification may be performed simply based on the shape of the histogram or may be performed while monitoring the contrast-corrected image. The histogram with label is set to teaching data (305).

As for the teaching data, a sample having 1000 frames for each pattern and having 3000 frames in total is prepared.

Next, the histogram extractor 41 extracts the features of each pattern from the teaching data (306).

As shown in FIG. 5, it is general to generate a histogram having a large number of areas (bins, classes) by using a brightness value extracted from an image. For example, when the brightness value is represented by 8 bit, 256 bins are generated. This is the same number as the number of gradations. Although they may be used as the features, when the features have a large number of dimensions, the learning machine requires more teaching data or the convergence of the learning is delayed.

In this example, a brightness value divider 502 generates a histogram 503 with 16 bins by merging multiple bins of a histogram 501 and values of the bins are used as the features.

Accordingly, 16 features are extracted from a single histogram. Or, the histograms may be generated as many as the number of deleted bins at the time of extraction of the grayscale histogram (303).

Next, as shown in FIGS. 3A and 3B, the learning is performed by the machine learning method based on the extracted features (307). In the learning, three registered patterns are generated as parameters to be used by the shape identifier 42 in the identification process. The registered patterns depend on types of the shape identifier 42.

As for the learning, it is possible to use any known method used for learning of the identifier, such as supervised learning using generated labels and unsupervised learning or the like.

In the simplest example of recognizing a specific object by supervised learning, the average values of the features of the histogram extracted for each of three labels, i.e., "normal shape", "arrow shape" and "flat shape", are calculated and stored as registered patterns (308).

In the example of using a fisher identifier, a parameter of a hyperplane which is the boundary of the registered patterns is stored as a registered pattern. In addition, a support vector machine, a convolutional neural network or the like may be used for the identification. At that time, registered patterns suitable therefor are generated and stored.

In the unsupervised learning method, the learning can be performed without attaching the label to the histogram.

In the unsupervised learning method, it is possible to use clustering of mean shift and k-means. At this time, the histogram to be learned is classified into three and, thus, the number of clusters is three. In that case as well, the representative position (center or the like) of each cluster is stored as a registered pattern.

Figure 6:
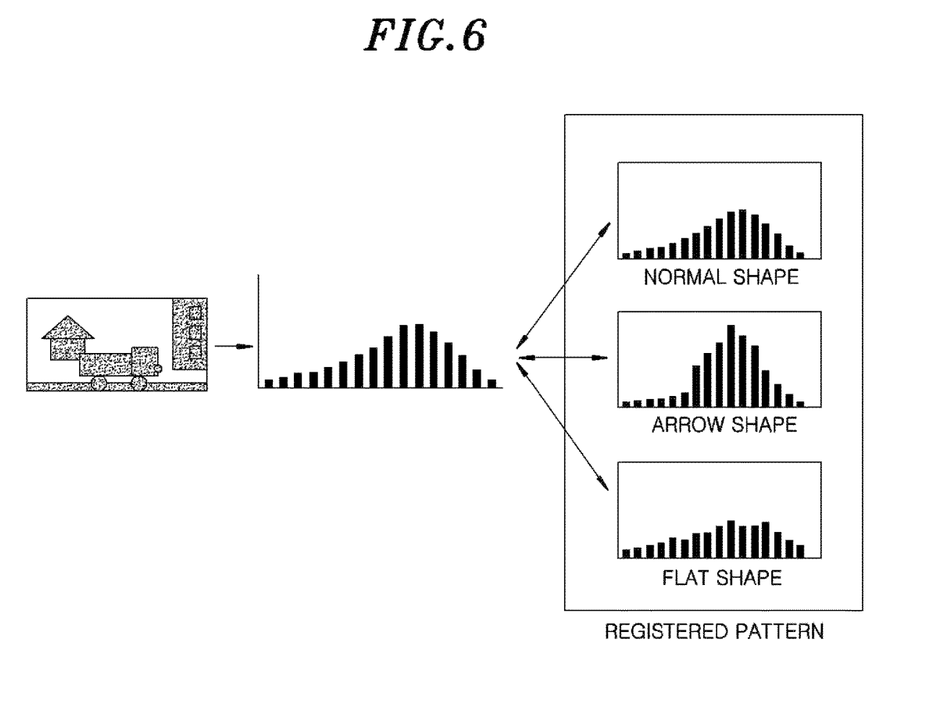
FIG. 6 explains an outline of a matching process in an identification step.

(Identification Step: FIGS. 3A, 3B and 6)

Next, the identification step in the contrast correction unit 14 of the present apparatus will be described with reference to FIGS. 3A, 3B and 6. FIG. 6 shows the concept of the matching process in the identification step.

In the identification step, as shown in FIG. 3B, the contrast correction unit 14 calculates an upper and a lower limit value of a brightness value for contrast expansion in the image inputted after the operation of the present apparatus. In the contrast correction unit 14, as in the learning step, the histogram extractor 41 generates a grayscale histogram of an input image (309), and the shape identifier 42 extracts the features of 16 classes (see FIG. 5) and sets the extracted features as the features of the corresponding image (310).

The shape identifier 42 identifies (matches) the pattern of the extracted features based on the stored three registered patterns (312).

The simplest matching will be described with reference to FIG. 6. Here, it is assumed that the representative value (average of the features or the like) of the corresponding pattern which is learned by a specific target recognition method or the like is stored as the registered pattern.

The shape identifier 42 compares the histogram extracted from the input image and the frequency of 16 classes in a first registered pattern.

Specifically, the shape identifier 42 compares the features (frequency) between the registered pattern and the extracted histogram and obtains the difference. When an absolute value of the difference is smaller than or equal to a preset first threshold value, it is determined as a positive indicator. When it is greater than the first threshold value, it is determined as a negative indicator. In other words, 16 (positive or negative) indicators in total are obtained from a single histogram.

As shown in FIG. 6, the matching is performed on the three registered patterns and the number of positive indicators in each pattern is calculated.

The shape identifier 42 identifies the registered pattern having "a largest number of positive indicators which is greater than or equal to a preset second threshold value" as a pattern having a shape close to the shape of the histogram of the input image.

When the number of positive indicators is extremely small, the input image is not related with any of the registered patterns and thus is identified as "others".

A first threshold value is set such that an appropriate number of positive indicators are deviated. For example, the first threshold value is set to a few percent of "(the number of pixels used for histogram extraction)/16".

When the histogram of the input pixel (e.g., V shape) is not identified as any of the registered pattern and the pattern identification fails, the result thereof is not used. For example, the second threshold value is set to be slightly smaller than the number of positive indicators in the case of identifying the histogram (teaching data) used in the learning step as a correct registered pattern.

In the case of learning using clustering and other highly advanced methods, a distance in a feature space (vector space indicating the features) can be calculated for the input features.

Therefore, the shape identifier 42 identifies the histogram by measuring the features extracted from the input image to know which registered pattern (cluster) is close to the features extracted from the input image.

The distance to the cluster can be calculated by using the Euclid's distance and the Mahalanobis' distance. The threshold value is set to a distance to the sample of the learned cluster which is farthest from the center of the corresponding cluster.

The matching is performed as described above and the registered pattern closest to the shape of the grayscale histogram of the input pixel is identified. Then, the shape identifier 42 notifies the identified shape to the upper and lower limit value search processing unit 43.

The upper and lower limit value search processing unit 43 selects the optimal threshold value of the frequency and the optimal scanning start position based on the notified shape (313).

The upper and lower limit value search processing unit 43 performs the upper and lower limit value searching process of calculating the upper and the lower limit value based on the threshold value of the frequency and the scanning start position (314).

The present embodiment is characterized in that the upper and lower limit value search processing unit 43 selects an optimal scanning speed in accordance with the shape of the histogram and performs the upper and lower limit value search process while moving the bin at the selected scanning speed. The loop-shaped process 314 shown in FIG. 3B indicates the scanning speed calculation process.

The operation of the upper and lower limit value search processing unit 43 will be described later.

When the upper and lower limit value are calculated, the upper and lower limit value search processing unit 43 sets the calculated upper and lower limit value in the contrast expansion processing unit 45 (315).

(Selection of Scanning Start Position in Upper and Lower Limit Value Search Process)

Next, the selection of the scanning start position in accordance with the shape of the histogram in the upper and lower limit value search processing unit 43 of the contrast correction unit 14 will be described.

In the upper and lower limit value search processing unit 43, when the histogram having the "arrow shape" is inputted (notified) by the shape identifier 42, the scanning start position in the upper and lower limit value searching process is set to be deviated from the position of the default (initial value at the end of the histogram) toward the center.

Specifically, the upper and lower limit value search processing unit 43 calculates a distance between the end and the class corresponding to the peak in the histogram based on the bin number.

When this distance exceeds the predetermined threshold value for determining the scanning start position, the predetermined position near the peak is set as the scanning start position.

Accordingly, in the arrow-shaped distribution in which the peak of the frequency is extremely close to the low brightness side, for example, the scanning can be started at a position closer to the peak, not from the end of the high brightness, in searching the upper limit value and, thus, the convergence time of the upper and lower limit value searching process can be shortened.

In this example, when the identified histogram has a normal shape or a flat shape, the upper and lower limit value search processing unit 43 starts the scanning from the end of the histogram as default. However, the scanning start position may be changed depending on the shape.

(Selection of Threshold Value in Upper and Lower Limit Value Searching Process)

Next, the selection of the threshold value of the frequency in accordance with the histogram shape in the upper and lower limit value search processing unit 43 will be described.

As shown in FIGS. 12A and 12B, in the conventional case, the threshold value is constant regardless of the shape of the histogram. However, in the present apparatus, the threshold value may be set in accordance with the shape.

In other words, the upper and lower limit value search processing unit 43 selects a threshold value among previously stored proper threshold values corresponding to the flat shape, the normal shape and the arrow shape when the grayscale histogram shape of the input image which is identified by the shape identifier 42 is inputted.

For example, the threshold values for the respective shapes satisfy the condition "flat shape<normal shape<arrow shape".

Therefore, in the arrow shape, the upper and the lower limit value are set at the brightness at which the frequency is higher than that in the normal shape (position close to the peak). Accordingly, it is possible to prevent the upper and lower limit value from being set far from the foot of the mountain of the histogram and improve the calculation accuracy of the upper and lower limit value.

In the flat shape in which the pixels are uniformly distributed over a wide brightness range, the convergence time of the upper and lower limit value calculation process becomes shorter than that in the normal shape.

Figure 7A:
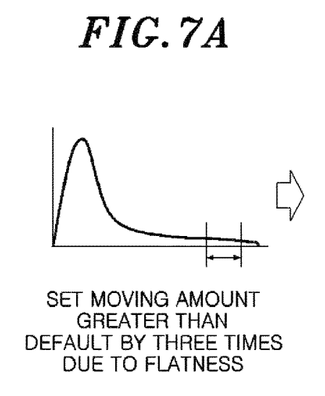
FIG. 7A to 7C explain an outline of scanning speed selection in an upper and lower limit value searching process of the present apparatus.
Figure 7B:
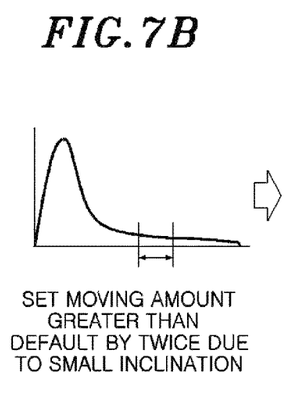
Figure 7C:
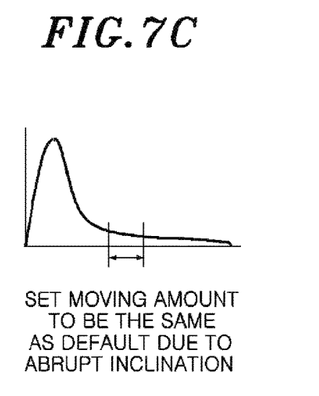

(Outline of Selection Of Bin Scanning Speed: FIGS. 7A to 7C)

Next, the outline of selection of the scanning speed in the upper and lower limit value searching process of the present apparatus will be described with reference to FIGS. 7A to 7C. FIGS. 7A to 7C explain the outline of the selection of the scanning speed in the upper and lower limit value searching process of the present apparatus.

In the upper and lower limit value search processing unit 43 of the present apparatus, the scanning speed of two bins adjacent in accordance with the brightness is selected based on the inclination of the grayscale histogram.

For example, as shown in FIG. 7A, the inclination of the grayscale histogram is substantially horizontal near the end of the high brightness side. Therefore, when the upper limit value is searched, the moving amount of the bin is set to be greater than the default (specified value) by three times, for example. Accordingly, the moving speed of the bin becomes three times faster.

The moving amount of the bin indicates a distance from the current position of the bin on the brightness axis to the position of the bin in a next frame in the case of not determining the upper and the lower limit value in the current frame and performing the determination process in the next frame.

At the portion where the inclination is small, even if the bin is moved by a large amount, the calculation accuracy of the upper and lower limit value does not deteriorate and the processing efficiency can be improved.

The default of the moving amount of the bin is the same as the width of the bins adjacent to each other with the upper limit value candidate therebetween, for example.

As shown in FIG. 7B, at the portion closer to the low brightness side, the inclination is gradual and, thus, the moving amount is set to be greater than the default by twice.

As shown in FIG. 7C, at the portion near the foot of the mountain, the inclination becomes abrupt and, thus, the moving amount becomes the same as the default.

By changing the scanning speed of the bin in accordance with the inclination of the grayscale histogram, unnecessary processes can be omitted without decreasing the search accuracy and the time required for searching the upper and the lower limit value can be shortened.

Figure 8:
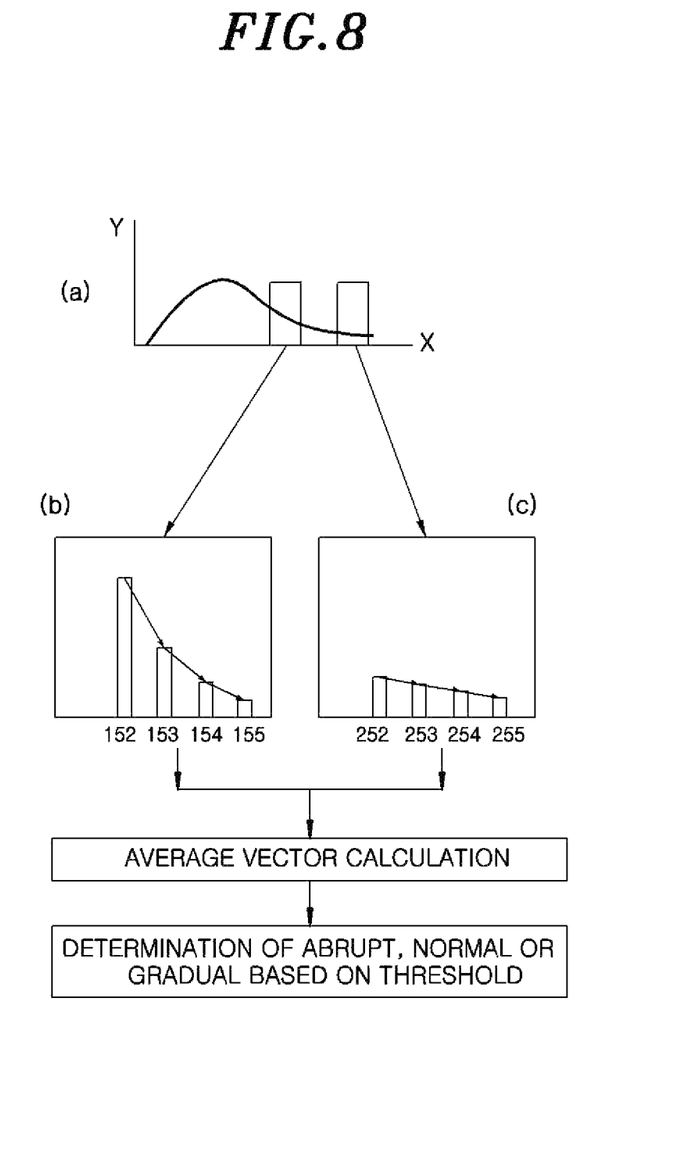
FIG. 8 explains a process of calculating a scanning speed of a bin.

(Calculation of Scanning Speed: FIG. 8)

Next, the process of calculating the scanning speed of the bin which is performed during the upper and lower limit value searching process will be described with reference to FIG. 8. FIG. 8 explains the process of calculating the scanning speed of the bin.

In the upper and lower limit value searching process of the present apparatus, the upper and lower limit value search processing unit 43 calculates the upper and the lower limit value while controlling the scanning speed in accordance with the shape (inclination) of the histogram.

In other words, the scanning speed calculation process (scanning speed calculation process) is performed during the upper and lower limit value searching process.

In the upper and lower limit value searching process, as shown in FIGS. 11A to 11D, the frequency values of two adjacent bins with the upper and lower limit value candidate therebetween are compared with the threshold value of the frequency. When the condition in which the frequency value of one of the bins is greater than or equal to the threshold value and the frequency value of the other bin is smaller than the threshold value is not satisfied (when the upper and the lower limit value are not determined), the bin is moved in a next frame. The moving amount at that time is determined in the scanning speed calculation process.

For example, as shown in (a) of FIG. 8, in a state where the bin number in the histogram (histogram number) is set to X and the frequency value (frequency) is set to Y, a specific range near the current upper limit value candidate is set to a vector calculation range and the vector is calculated based on frequency values of adjacent histogram numbers. The vector calculation range is randomly set.

In the inclination calculation process, the vector is calculated by using the grayscale histogram having a large number of bins which is extracted from by the histogram extractor 41, instead of using the histogram indicating the features of 16 classes.

In (b) of FIG. 8, the vector of the frequency adjacent to the range of the histogram numbers 152, 153, 154 and 155 is calculated. In (c) of FIG. 8, the vector of the frequency adjacent to the range of the histogram numbers 252, 253, 254 and 255 is calculated.

The upper and lower limit value search processing unit 43 calculates an average vector of three calculated vectors and classifies the inclination of the histogram in the corresponding range into "abrupt", "normal" and "gradual" based on the average vector.

In the upper and lower limit value searching unit 43, the threshold value for classifying the inclination is previously stored.

When the inclination is determined to be "gradual", the position of the bin (i.e., the position of the upper limit value candidate) is moved in a next frame by the amount that is three times greater than the default and the next searching process is performed.

In the case of "normal", the moving amount of the bin is set to be greater than the default by twice. In the case of "abrupt", the moving amount of the bin is set to be the same as the default.

In the examples shown in FIG. 8, when the upper limit value is searched at the high brightness side, the inclination is determined to be "gradual" from the average vector in the range shown in (c) of FIG. 8 and the bin is moved by the amount that is three times greater than the default. However, the inclination is determined to be "abrupt" in the range shown in (b) of FIG. 8 and the moving amount becomes the same as the default.

In the case of searching the lower limit value, the inclination is calculated from the average vector and the lower limit value searching process is performed while moving the bin.

Accordingly, the searching process can be quickly converged without deteriorating the accuracy.

When the inclination classified into "gradual" is continued for two frames, the bin is moved in a next frame by the amount that is four times greater than the default and the searching process is performed.

Accordingly, the time required for the searching process can be further shortened.

It is possible to arbitrarily set the moving amount of the bin with respect to the default in accordance with the inclination or the number of consecutive frames of "gradual" for speed up.

In the present embodiment, it is possible to shorten the processing time without deteriorating the searching accuracy and optimize the upper and lower limit value searching process by identifying the shape of the grayscale histogram, appropriately setting the threshold value of the frequency and the scanning start position of the searching process, and setting the scanning speed based on the calculated inclination of the grayscale histogram having a large number of bins. However, the processing time can become shorter than that in the conventional case only by combining any of the threshold value, the scanning start position and the scanning speed.

In other words, the processing time can be shortened without deteriorating the searching accuracy in the upper and the lower limit value searching process only by setting the scanning speed based on the calculated inclination in a specific range without identifying the entire shape of the grayscale histogram.

Or, in the case of "arrow shape" based on the entire shape identified during the identification step, it is possible to preset a predetermined number of frames immediately after the start of scanning to be three times greater than the default, twice greater than the default, and then to be the same as the default.

Accordingly, the processing can be considerably simplified compared to the case of vector calculation.

(Effect of the Embodiments)

In the imaging device and the image processing method according to the embodiments of the present invention, the shape identifier 42 extracts the grayscale histogram of the input image and the upper and lower limit value search processing unit 43 performs the upper and lower limit value searching process of comparing the frequency of two adjacent areas in accordance with the brightness of the grayscale histogram with the threshold value while scanning the two areas and determining a brightness value that is the boundary of the two areas as an upper or a lower limit value when the frequency of one of the areas is greater than or equal to the threshold value and the frequency of the other area is smaller than the threshold value. When the upper and the lower limit value are not determined in the upper and lower limit value calculation process, the inclination of the histogram is obtained from the frequency of the bin adjacent to the current upper and lower limit value candidate. When the inclination is gradual, the moving amount of the upper and lower limit value candidate in a next frame is set to be three times greater than the specified value. When the inclination is normal, the moving amount is set to be twice greater than the specified value. When the inclination is abrupt, the moving amount is set to the specific value. Therefore, the processing speed can be increased by increasing the scanning speed at a portion far from the foot of the mountain which hardly affects the searching and, also, the upper and the lower limit value can be accurately obtained by decreasing the scanning speed near the foot of the mountain. Further, the time required for the searching can be shortened in accordance with the shape of the grayscale histogram while maintaining the upper and lower limit value searching accuracy.

In accordance with the present apparatus and the present method, in the learning step, the shape identifier 42 extracts the features of the shapes of a plurality of grayscale histograms from the teaching data; the extracted features are learned by a machine learning method; and the registered patterns "normal shape", "arrow shape" and "flat shape" are stored. In the identification step, the features extracted from the grayscale histogram of the input image are compared with the features of the registered patterns; the registered pattern close to the shape is identified; and the scanning start position in the searching process and the threshold value of the frequency are set based on the identified pattern. Therefore, the optimal scanning start position and/or the threshold value of the frequency can be set in accordance with the shape of the grayscale histogram of the input image and the processing time can be shortened while improving the searching accuracy.

INDUSTRIAL APPLICABILITY

The present invention is suitable for an imaging device and an image processing method capable of quickly and accurately determining an upper and a lower limit value in accordance with a shape of a grayscale histogram.

DESCRIPTION OF REFERENCE NUMERALS

11: image sensor
12: A/D converter
13: signal processing unit
14: contrast correction unit
15: output circuit
41: histogram extractor
42 shape identifier
43: upper and lower limit value search processing unit
44: contrast expansion processing unit
502: brightness value divider

What is claimed is:
1. An imaging device comprising:
a contrast correction unit configured to extract a grayscale histogram from an input image and expand a contrast in a specific brightness range in the grayscale histogram, wherein the contrast correction unit includes:
an upper and lower limit value search processing unit for scanning two adjacent areas in accordance with brightness in a grayscale histogram of one frame extracted from the input image and determining whether or not a condition in which a frequency of brightness in one of the two adjacent areas is greater than or equal to a preset threshold value and a frequency of brightness in the other area is smaller than the threshold value is satisfied,
wherein when the condition is not satisfied, scanning speeds of the two adjacent areas are controlled by changing a moving amount from the positions of the two adjacent areas to positions of next two adjacent areas in accordance with brightness in a grayscale histogram of next one frame based on a shape of the grayscale histogram and the determination process is performed on the grayscale histogram of the next one frame, and
wherein when the condition is satisfied, a brightness value at a boundary of the two adjacent areas is determined as an upper or a lower limit value of the specific brightness range.

2. The imaging device of claim 1, wherein the contrast correction unit includes:
a shape identifier for storing a plurality of shape patterns by learning features of typical shapes of a grayscale histogram, calculating features of a shape of a grayscale histogram extracted from an input image, and identifying a shape by comparing the calculated features and the features of the stored shape pattern; and
an upper and lower limit value search processing unit for adjusting scanning start positions of the two adjacent areas and/or a threshold value based on the identified shape.

3. The imaging device of claim 2, wherein when the condition is not satisfied in the determination process, the upper and lower limit value search processing unit obtains a plurality of vectors between adjacent frequency values in a specific range near the two adjacent areas, determines an inclination of a grayscale histogram based on an average vector of the plurality of vectors, and controls a scanning speed by changing a moving distance from the positions of the two adjacent areas to the positions of the next two adjacent areas in accordance with brightness in the grayscale histogram of the next one frame based on the inclination.

4. An imaging device comprising:
a contrast correction unit configured to extract a grayscale histogram from an input image and expand a contrast in a specific brightness range in the grayscale histogram, wherein the contrast correction unit includes:
a shape identifier for identifying a shape of the grayscale histogram; and
an upper and lower limit value search processing unit for performing upper and lower limit value search processing for scanning two adjacent areas in accordance with brightness of the grayscale histogram and determining an upper and a lower limit value of the specific brightness range based on comparison between frequency values of the two adjacent areas and a preset threshold value, and
wherein the upper and lower limit value search processing unit adjusts scanning start positions of the two adjacent areas and/or the threshold value based on a shape identified by the shape identifier and performs the upper and lower limit value search processing by using the adjusted scanning start position and/or the controlled threshold value.

5. The imaging device of claim 4, wherein the contrast correction unit includes:
a shape identifier for storing a plurality of shape patterns by learning features of typical shapes of a grayscale histogram, calculating features of a shape of a grayscale histogram extracted from an input image, and identifying a shape by comparing the calculated features and the features of the stored shape pattern; and
an upper and lower limit value search processing unit for adjusting scanning start positions of the two adjacent areas and/or a threshold value based on the identified shape.

6. The imaging device of claim 5, wherein when the condition is not satisfied in the determination process, the upper and lower limit value search processing unit obtains a plurality of vectors between adjacent frequency values in a specific range near the two adjacent areas, determines an inclination of a grayscale histogram based on an average vector of the plurality of vectors, and controls a scanning speed by changing a moving distance from the positions of the two adjacent areas to positions of next two adjacent areas in accordance with brightness in a grayscale histogram of next one frame based on the inclination.

7. An image processing method for extracting a grayscale histogram from an input image and expanding a contrast in a specific brightness range in the grayscale histogram, the method comprising:

storing a plurality of shape patterns by learning features of typical shapes of a grayscale histogram, calculating features of a shape of a grayscale histogram extracted from an input image, and identifying a shape by comparing the calculated features and the features of the stored shape pattern; and     scanning two adjacent areas in accordance with brightness in the grayscale histogram at a scanning start position adjusted based on the identified shape in accordance with the brightness and determining whether or not a condition in which a frequency of brightness in one of the two adjacent areas is greater than or equal to a threshold value identified based on the identified shape and a frequency of brightness in the other area is smaller than or equal to the threshold value is satisfied, wherein when the condition is not satisfied, a plurality of vectors between adjacent frequency values is obtained in a specific range near the two adjacent areas; an inclination of the grayscale histogram is determined based on an average vector of the plurality of vectors; a scanning speed of the two adjacent areas is controlled by changing a moving distance from the positions of the two adjacent areas to positions of next two adjacent areas in accordance with brightness in a grayscale histogram of next one frame based on the inclination; and the determination process is performed on a grayscale histogram of next one frame, and wherein when the condition is satisfied, a brightness value at a boundary of the two adjacent areas is determined as an upper or a lower limit value of the specific brightness range.

\* \* \* \* \*